(12) United States Patent
Stamps et al.

(10) Patent No.: US 8,956,117 B2
(45) Date of Patent: Feb. 17, 2015

(54) STIFF-IN-PLANE ROTOR CONFIGURATION

(75) Inventors: Frank B. Stamps, Colleyville, TX (US);
Patrick R. Tisdale, Roanoke, TX (US);
Tom Donovan, Fort Worth, TX (US);
Richard E. Rauber, Euless, TX (US)

(73) Assignee: Textron Innovations Inc., Providence, RI (US)

( * ) Notice: Subject to any disclaimer, the term of this patent is extended or adjusted under 35 U.S.C. 154(b) by 804 days.

(21) Appl. No.: 13/144,448

(22) PCT Filed: Jan. 19, 2009

(86) PCT No.: PCT/US2009/031381
§ 371 (c)(1),
(2), (4) Date: Jul. 13, 2011

(87) PCT Pub. No.: WO2010/082936
PCT Pub. Date: Jul. 22, 2010

(65) Prior Publication Data
US 2011/0274548 A1      Nov. 10, 2011

(51) Int. Cl.
*B64C 27/33*     (2006.01)
*B64C 27/32*     (2006.01)

(52) U.S. Cl.
CPC ............... *B64C 27/33* (2013.01); *B64C 27/32* (2013.01)
USPC ...................................................... 416/134 A

(58) Field of Classification Search
CPC ...................................................... B64C 27/33
USPC .............................. 416/134 A, 141, 135, 136
See application file for complete search history.

(56) References Cited

U.S. PATENT DOCUMENTS

| | | | |
|---|---|---|---|
| 4,427,340 A | 1/1984 | Metzger et al. | |
| 4,462,755 A | 7/1984 | Ogle et al. | |
| 7,845,909 B2 * | 12/2010 | Stamps et al. | ............ 416/134 A |
| 2008/0003106 A1 | 1/2008 | Kismarton | |

(Continued)

FOREIGN PATENT DOCUMENTS

| | | |
|---|---|---|
| FR | 2351006 | 12/1977 |
| GB | 1535391 A | * 12/1978 |
| WO | 2006081181 A2 | 8/2006 |

OTHER PUBLICATIONS

International Search Report mailed by ISA/USA, U.S. Patent and Trademark Office on Mar. 10, 2009 for International Patent Application No. PCT/US09/31381.

(Continued)

*Primary Examiner* — Richard Edgar
(74) *Attorney, Agent, or Firm* — James E. Walton; Brian E. Harris

(57) ABSTRACT

A rotor assembly for a rotary-wing aircraft, the rotor having a central hub assembly with a flexure-type, twist-shank yoke with multiple arms, each arm being adapted for a rotor blade to be mounted thereto. The arms provide for pitch changes of blades attached to the yoke through twisting of portions of the arms about a corresponding pitch axis. An inboard pitch bearing associated with each arm is attached to the hub assembly and allows for rotation of the attached blade about the pitch axis, the inboard pitch bearing also allowing for out-of-plane motion of the arm relative to the hub assembly about a flapping axis. An outboard pitch bearing associated with each arm is attached to the associated arm a selected distance from the inboard pitch bearing and allows for rotation of the attached blade about the pitch axis.

3 Claims, 7 Drawing Sheets

(56) References Cited

U.S. PATENT DOCUMENTS

2008/0101934 A1 5/2008 Stamps et al.
2008/0292468 A1 11/2008 Stamps et al.

OTHER PUBLICATIONS

International Preliminary Report on Patentability mailed by IPEA/USA, U.S. Patent and Trademark Office on Mar. 15, 2011 for International Patent Application No. PCT/US09/31381.

Chinese Office Action in related Chinese patent application No. 200980153945.4, issued Dec. 30, 2013, 5 pages.
Chinese Office Action in related Chinese patent application No. 200980153945.4, issued Jun. 5, 2013, 6 pages.
Office Action dated Jul. 14, 2014 from counterpart CA App. No. 2,749,118.
Extended European Search Report Office Action dated Oct. 10, 2014 from counterpart EP App. No. 09838518.0.

* cited by examiner

STIFF-IN-PLANE ROTOR CONFIGURATION

TECHNICAL FIELD

The technical field is stiff-in-plane rotors for rotary-wing aircraft.

DESCRIPTION OF PRIOR ART

Rotor assemblies for rotary-wing aircraft, such as helicopters and tiltrotors, have many configurations. The Bell/Boeing V-22 tiltrotor, for example, has a gimbaled hub, allowing the entire hub to gimbal relative to the mast during flapping while the blades remain in a fixed in-plane orientation relative to the hub. Other rotary-wing aircraft have fully or semi-articulated configurations, in which blades are allowed to flap relative to the hub and may move through in-plane lead-lag motions relative to the hub.

Though some prior-art rotor assemblies have been successful, many shortcomings remain.

DESCRIPTION OF THE PREFERRED EMBODIMENT

Figure 1:
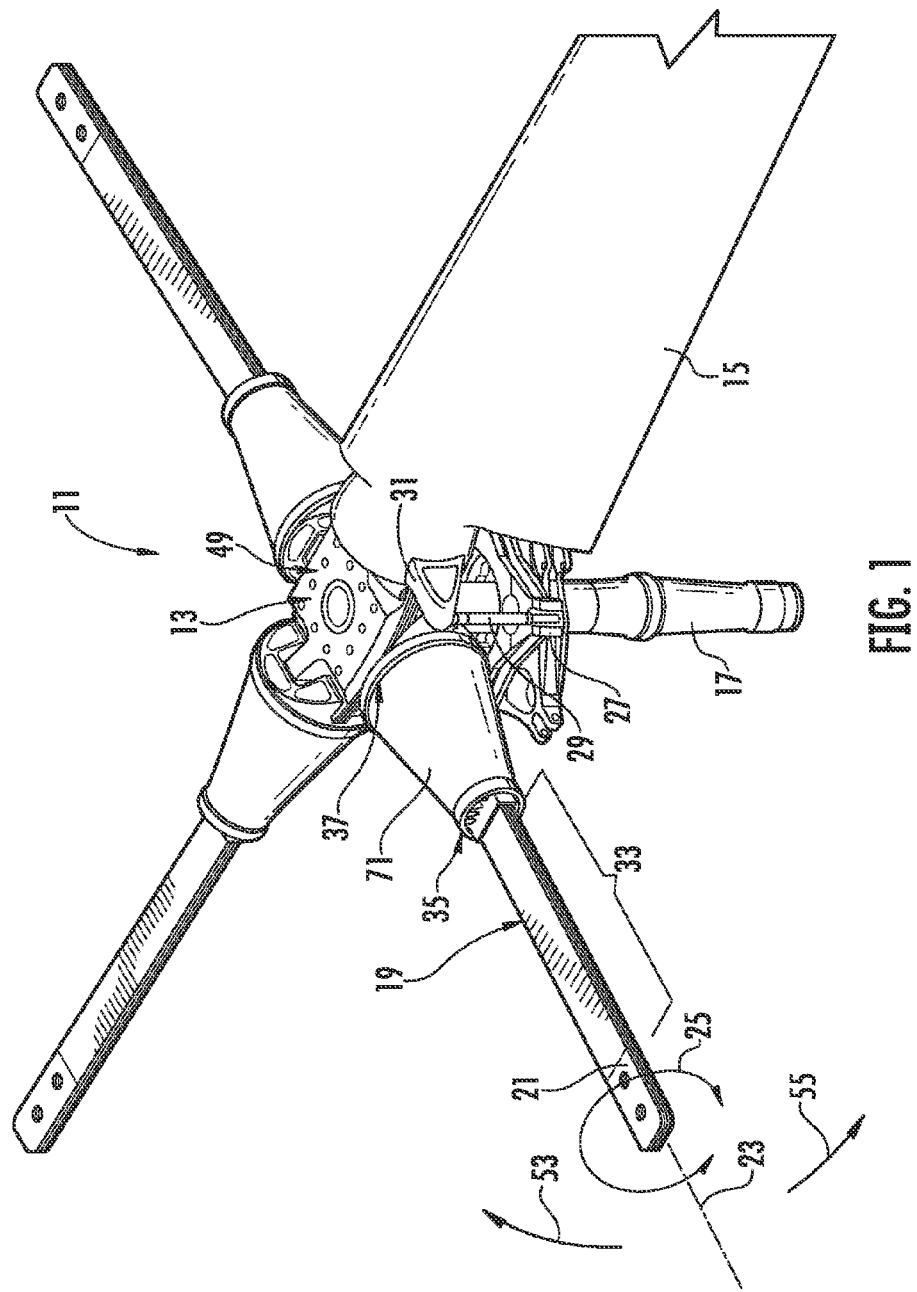
FIG. 1 is an oblique view of a rotor assembly with some components removed for ease of viewing.
Figure 2:
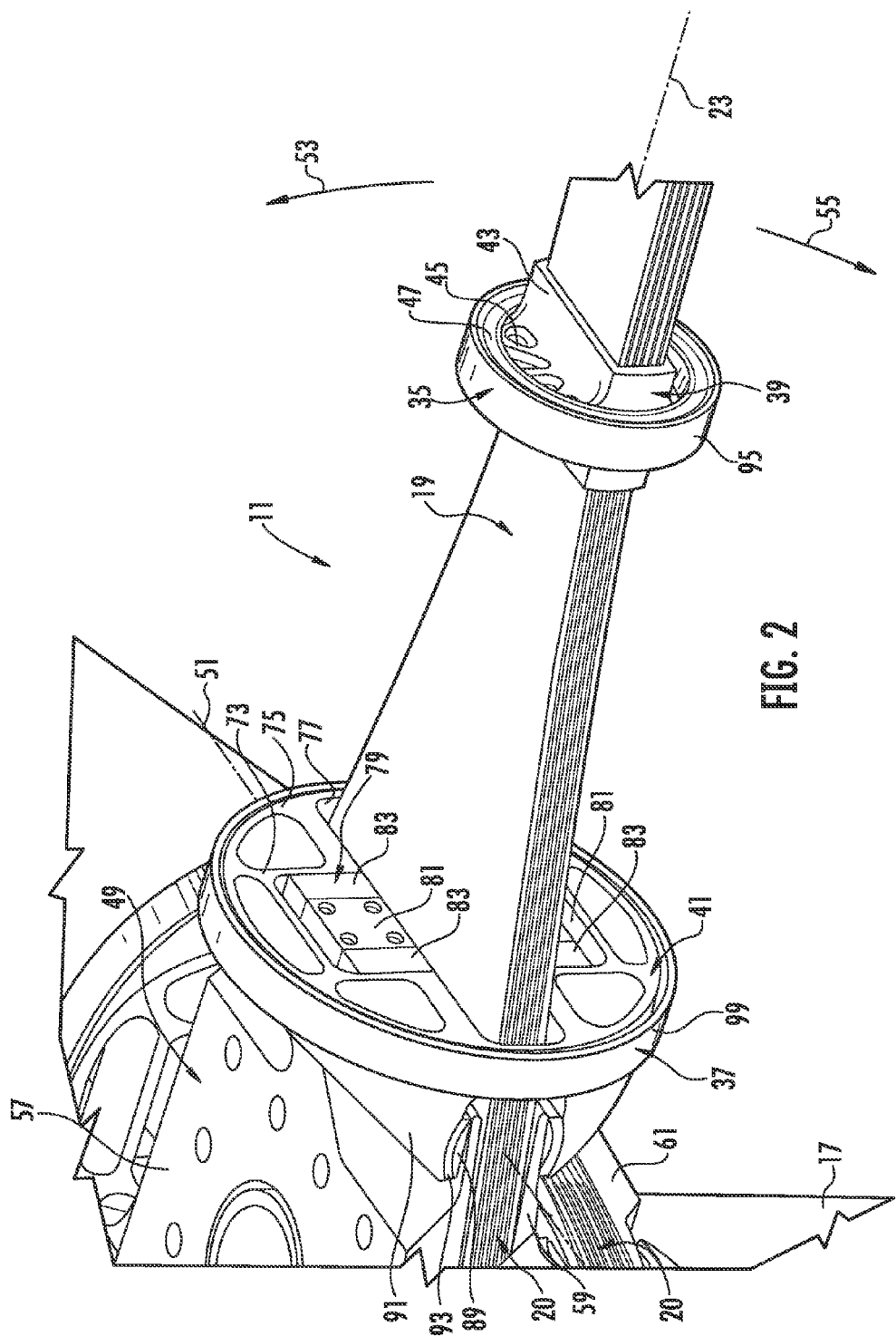
FIG. 2 is an oblique view of a portion of the rotor assembly of FIG. 1 with additional components removed for ease of viewing.

An improved stiff-in-plane rotor configuration has a flexure-type hub and two pitch bearings per blade, the pitch bearings being spaced from each other. The design provides for a compact hub center, which reduces flapping moments, weight, and cost of the rotor.

Referring to FIGS. 1 through 4, a rotor assembly 11 comprises a hub assembly 13 and rotor blades 15 (only one shown) configured to be mounted to hub assembly 13. Hub assembly 13 is mounted on mast 17 with splines or other appropriate means, allowing mast 17 to drive hub assembly 13 in rotation with mast 17. Blades 15 are each mounted to an arm 19 of a flexure-type, twist-shank yoke 20, arms 19 extending generally radially from yokes 20 in hub assembly 13. Each yoke 20 is preferably formed from a composite material, and the construction of yoke 20 allows for arms 19 to move in out-of-plane directions relative to the central portion of yoke 20 to allow for flapping of blades 15.

An outboard end of each arm 19 has a blade mount 21 adapted for connection with a portion of the corresponding blade 15 for transmitting forces from blade 15 to arm 19. The construction of each arm 19 allows the outboard portion of arm 19 to twist a limited amount about a pitch axis 23, as shown by arrow 25, such that each blade 15 is pivotable relative to the remainder of arm 19 and yoke 20 about pitch axis 23 while being fixedly attached to blade mount 21. The pitch angles of blades 15 are controlled by a swashplate mechanism 27, which is connected by a pitch link 29 to a pitch horn 31 on each blade 15. In the preferred embodiment, arms 19 are constructed so that approximately 95% of the twist of arms 19 during pitch changes of blades 15 occurs in region 33. For example, this may be accomplished by forming arm 19 so that it has a narrower chordwise width in region 33 than the chordwise width of the inboard portion of arm 19.

Preferably, but optionally, yoke 20 is formed from multiple layers of a composite material, such as fiberglass, separated with layers of elastomeric material. In the preferred embodiment, the layers of composite material are free to move relative to each other during out-of-plane (flapping) or torsional (pitch) deflection of arms 19. Use of yoke 20 having such a multi-layer design reduces flapping moments and also reduces torsional stiffness, which allows for use of a shorter twist-shank.

Two parallel pitch bearings 35, 37 are provided on an inboard portion of each arm 19 on which the inboard portion of each blade 15 rotates. Bearings 35, 37 are spaced from each other, allowing bearings 35, 37 to react in-plane shear loads of blade 15 and providing for a stiff-in-plane configuration.

Each bearing 35, 37 is supported by an associated bearing support 39, 41 associated with each arm 19. Bearing support 39 is mounted outboard of support 41, and support 39 preferably has a smaller diameter than support 41. Support 39 is mounted to arm 19 with a sleeve 43 shaped for tightly receiving the generally rectangular cross-sectional shape of arm 19. To prevent wear of the adjacent layers of arm 19, an elastomeric buffer (not shown) is preferably installed between the inner surface of sleeve 43 and the associated arm 19. A skeletonized web 45 extends outward from sleeve 43, and a circumferential ring 47 is attached to web 45 with a spherical elastomer layer 48. Layer 48 allows for a small amount of relative angular motion between web 45 and ring 47, which occurs as the angle between arm 19 and cone 71 changes during flapping of arm 19.

Each support 41 is not directly mounted to the associated arm 19, but is instead pivotally mounted to hub 49, allowing each support to pivot a limited amount about a flap axis 51 (shown in FIG. 2) during out-of-plane, or flapping, movement or arms 19. This out-of-plane movement may be in either direction, as shown by arrows 53, 55.

Figure 3:
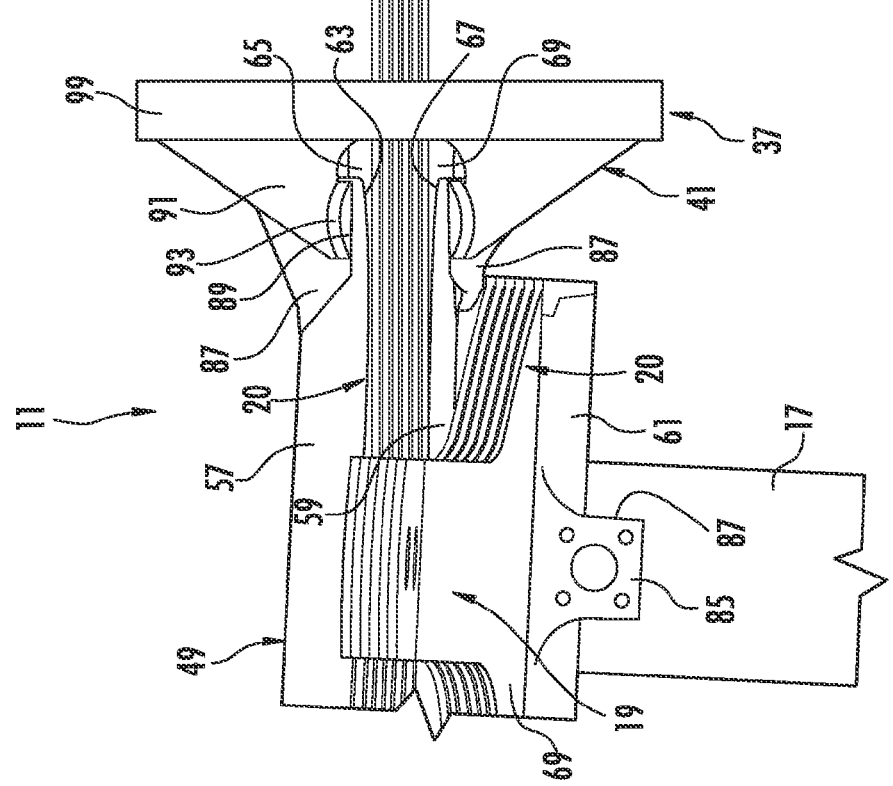
FIG. 3 is a side view of the portion FIG. 2.
Figure 4:
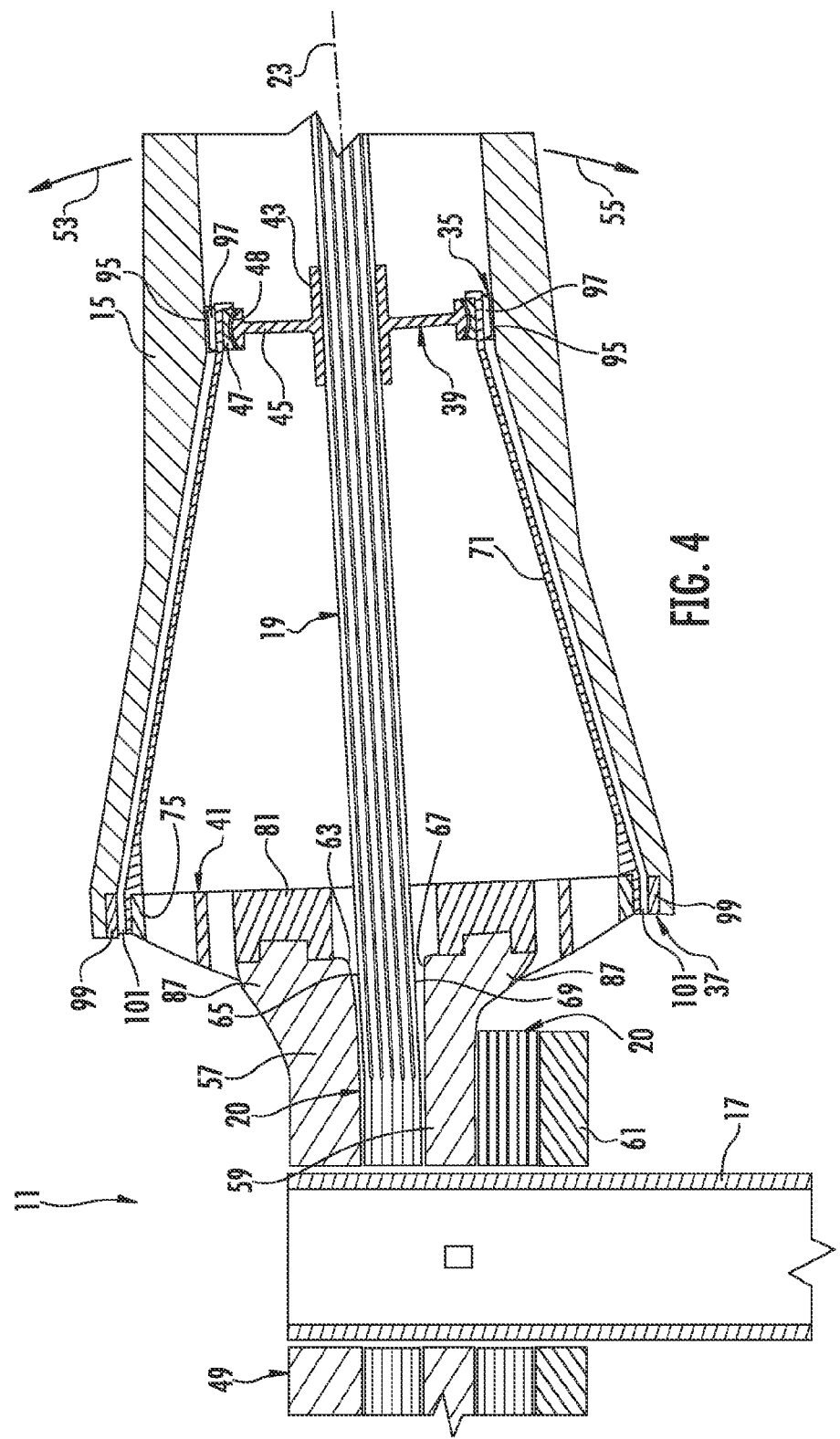
FIG. 4 is a cross-sectional view of a portion of the rotor assembly of FIG. 1.

Hub 49 comprises hub plates 57, 59, 61 and yokes 20, which are each mounted between two of plates 57, 59, 61 in a stacked arrangement. Each adjacent pair of plates 57, 59, 61 retains a yoke 20 therebetween and forms opposing augmented flexure regions for arms 19 of each yoke 20. FIGS. 3 and 4 show side and cross-sectional side views of one portion of assembly 11, and the flexure region for one of arms 19 is visible.

Upper hub plate 57 has a curved surface 63 at a peripheral edge, and upper surface 65 of yoke 20 bears against curved surface 63 as arm 19 moves in the direction of arrow 53. Curved surface 63 provides for reduction of bending stress concentrations occurring in yoke 20 during flapping. Likewise, middle plate 59 has a curved surface 67 at a peripheral edge, and lower surface 69 of yoke 20 bears against curved surface 67 as arm 19 moves in the direction of arrow 55.

As arm 19 moves out-of-plane, bearing support 39 moves with arm 19, which would cause bearing 35 to become non-parallel to bearing 37. To prevent this, a conical, annular alignment brace 71 is mounted between supports 39, 41 to maintain parallel alignment of bearings 35, 37 during flapping of arm 19. As shown in FIG. 4, brace 71 fixedly engages support 41 and ring 47 of support 39, such that brace 71 does not rotate relative to support 41 and ring 47 about pitch axis 23. Brace 71 is preferably formed from aluminum, though brace 71 may be formed from any appropriately rigid material.

To allow for bearing support 41 to rotate about flap axis 51 with arm 19, each support 41 is pivotally mounted to hub 49. Support 41 comprises a skeletonized web 73 that terminates in a circumferential ring 75. An aperture 77 is formed in an inner portion of web 73, and arm 19 extends through aperture 77 without touching support 41. A bearing assembly 79 is mounted within web 73, assembly 79 comprising a rigid mount 81 and opposing elastomeric bearings 83 attached at an outer vertical surface to web 73. Assemblies 79 are installed above and below arm 19, and each assembly 79 is located generally adjacent aperture 77. Mount 81 of each assembly 79 is fixedly attached to an outboard face 85 of a flange 87 extending from each corresponding plate 57, 59, 61. For example, the portion shown in FIGS. 3 and 4 has flanges extending from upper plate 57 and middle plate 59, as is also true for the opposing arm 19. However, for arms 19 extending in perpendicular directions (i.e., into or out of the plane of the drawing), flanges extend from middle plate 59 and lower plate 61.

To define the flapping movement of support 41, plates 57, 59, 61 each have curved bearing surfaces 89, each of which have an axis of curvature that is coaxial with the associated flap axis 51. Four brackets 91 extend inboard from each web 73, two brackets 91 being located on each side of arm 19. Each bracket 91 terminates in a curved shoe 93 that slidingly engages a curved bearing surface 89 of one of plates 57, 59, 61, allowing for each support 41 to rotate a limited amount about the associated flap axis 51 relative to hub 49. In addition, mount 81 of each bearing assembly 79 remains fixed relative to hub 49, whereas elastomeric bearings 83 elastically deform to allow for the limited rotation of support 41 relative to flanges 87.

Brace 71 is fixedly attached to ring 47 of support 39 and to ring 75 of support 41, and brace 71 ensures that rings 47, 75 remain parallel to each other during flapping motion of arm 19. Thus, this configuration maintains bearings 35, 37 as parallel at all times.

Referring specifically to FIG. 4, brace 71 is shown installed on supports 39, 41. Bearing 35 comprises a circumferential outer race 95 and a bearing element 97, and bearing 37 comprises circumferential outer race 99 and bearing element 101. In the preferred embodiment, an adjacent outer surface of brace 71 acts as an inner race for each bearing 35, 37. Each bearing element 97, 101 is located between each outer race 95, 99 and the inner race portion of brace 71, and bearing elements 97, 101 may be of any appropriate type, such as sets of roller pins, sets of ball bearings, or polymer bearings. Outer races 95, 99 for each arm 19 are fixedly mounted within the corresponding blade 15, allowing blade 15 and races 95, 99 to rotate together about pitch axis 23 relative to the associated arm 19.

It should be noted that bearings 35 and 37 do not react centrifugal forces from blade 15. All of the centrifugal forces are transmitted into yoke 20 through the associated blade mount 21 at the outboard end of arm 19.

While the embodiment in the figures has pitch bearings 35, 37 that are shown as having unequal radii, it should be noted that alternative configurations may have bearings 35, 37 that are substantially equal in size, or the inboard bearing 37 may have a smaller radius than the outboard bearing 35. Therefore, in alternative configurations brace 71 may have a substantially cylindrical shape or may taper in the opposite direction as shown in the figures.

Figure 5:
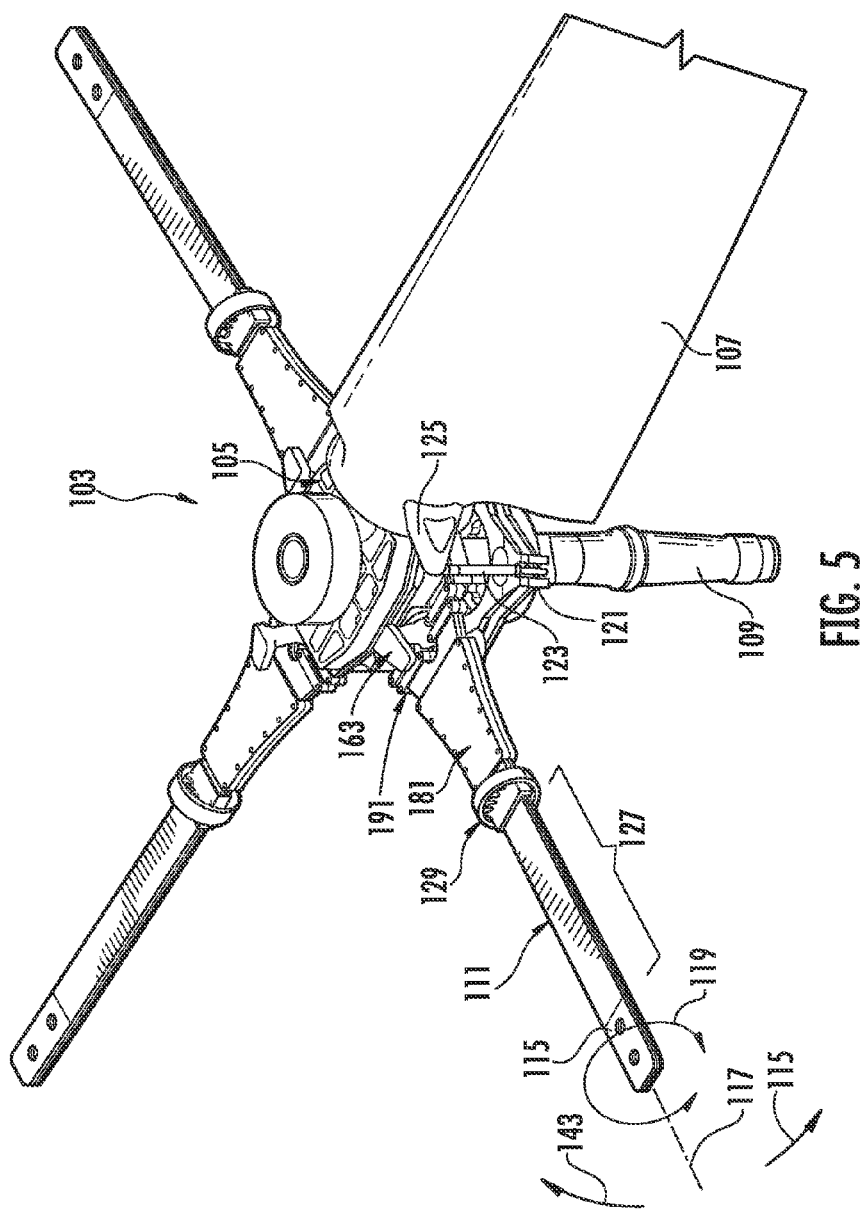
FIG. 5 is an oblique view of a rotor assembly with some components removed for ease of viewing.
Figure 6:
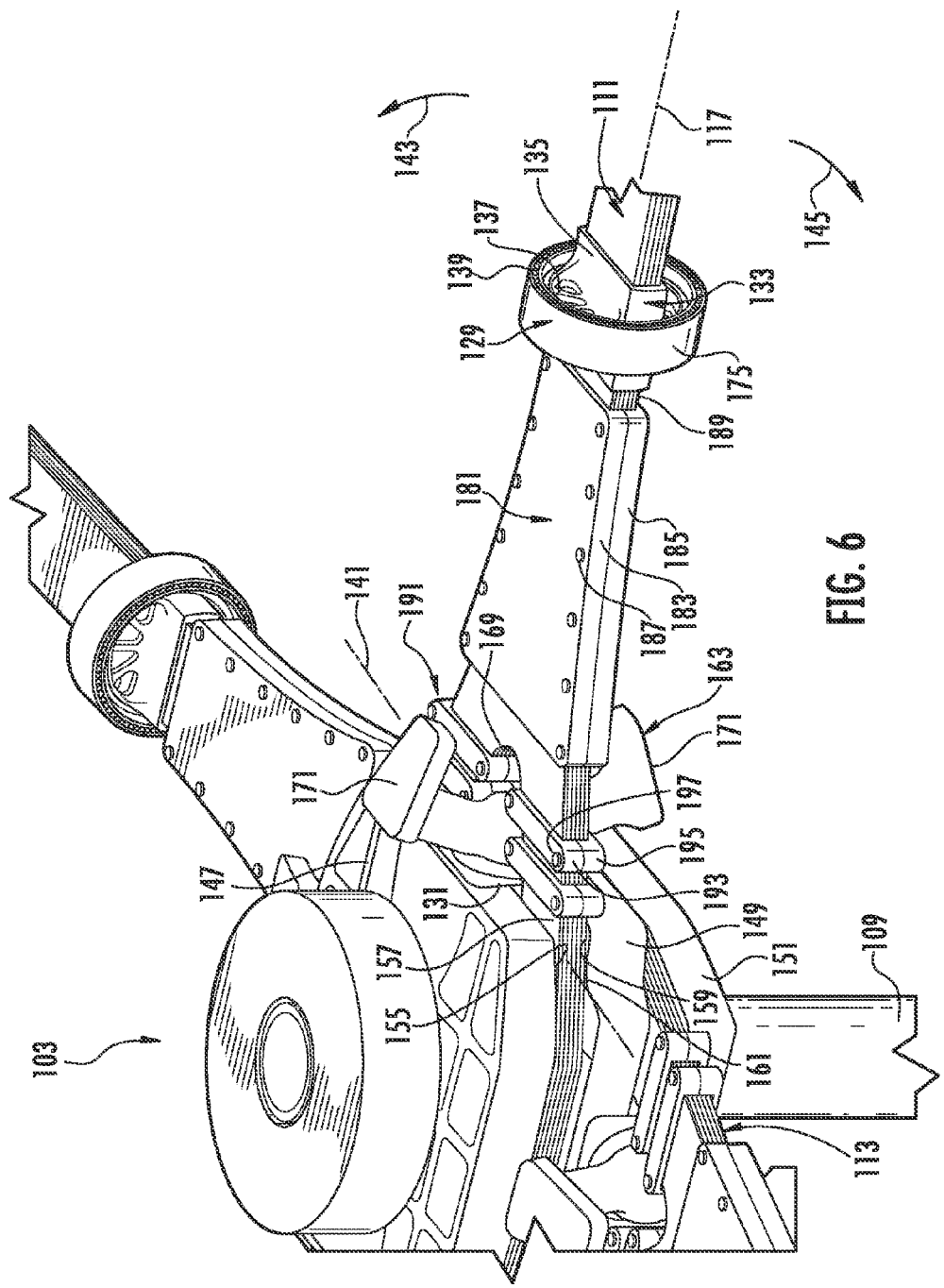
FIG. 6 is an oblique view of a portion of the rotor assembly of FIG. 5 with additional components removed for ease of viewing.
Figure 7:
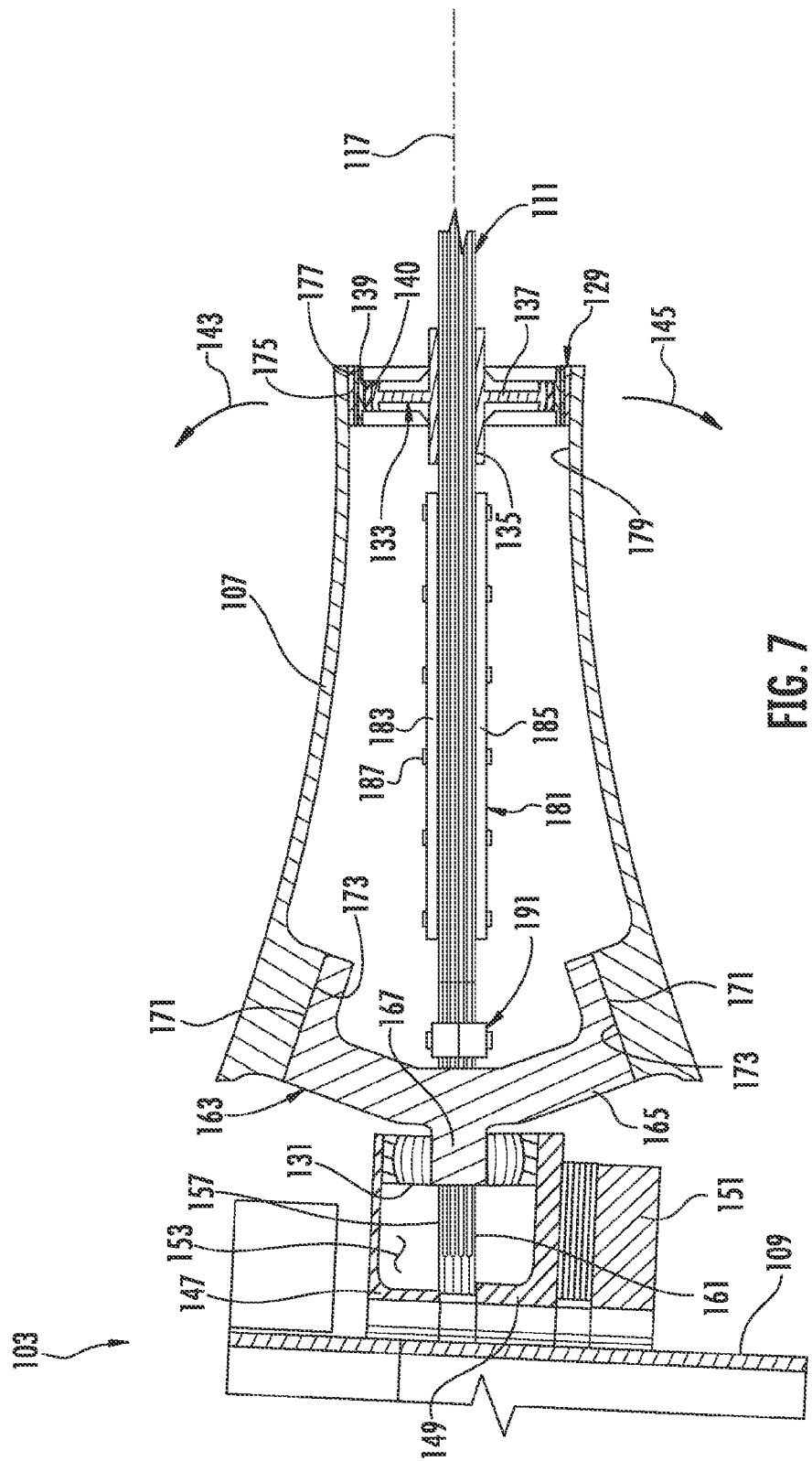
FIG. 7 is a cross-sectional view of a portion of the rotor assembly of FIG. 5.

Referring now to FIGS. 5 through 7, a rotor assembly 103 comprises a hub assembly 105 and rotor blades 107 (only one shown) configured to be mounted to hub assembly 105. Hub assembly 105 is mounted on mast 109 with splines or other appropriate means, allowing mast 109 to drive hub assembly 105 in rotation with mast 109. Blades 107 are each mounted to an arm 111 of a flexure-type, twist-shank yoke 113, arms 111 extending generally radially from yokes 113 in hub assembly 105. Each yoke 113 is preferably formed from layers of a composite material, such as fiberglass, and the construction allows for arms 111 to move in out-of-plane directions relative to the central portion of yoke 113 to allow for flapping of blades 107. An outboard end of each arm 111 has a blade mount 115 adapted for connection with a portion of the corresponding blade 107 for transmitting forces from blade 107 to arm 111. The construction of each arm 111 allows the outboard portion of arm 111 to twist a limited amount about a pitch axis 117, as shown by arrow 119, such that each blade 107 is pivotable relative to the remainder of hub assembly 105 about pitch axis 117 while being fixedly attached to blade mount 115. The pitch angles of blades 107 are controlled by a swashplate mechanism 121, which is connected by a pitch link 123 to a pitch horn 125 on each blade 107. In the preferred embodiment, arms 111 are constructed so that approximately 95% of the twist of arms 111 during pitch changes of blades 107 occurs in region 127. For example, this may be accomplished by forming arm 111 so that it has a narrower chordwise width in region 127 than the chordwise width of the inboard portion of arm 111.

A pitch bearing 129 is provided on an inboard portion of each arm 111 on which the inboard portion of each blade 107 rotates. In addition, a bearing 131 (see FIG. 7), which is a combination pitch and flap bearing, is located in hub assembly 105. Bearings 129, 131 are spaced from each other, allowing bearings 129, 131 to react in-plane shear loads of blade 15 and providing for a stiff-in-plane configuration.

Bearing 129 is supported by an corresponding bearing support 133 associated with each arm 111. Support 133 is mounted to arm 111 with a sleeve 135 shaped for tightly receiving the generally rectangular cross-sectional shape of arm 111. To prevent wear of the adjacent layers of arm 111, an elastomeric buffer (not shown) is preferably installed between the inner surface of sleeve 135 and the associated arm 111. A skeletonized web 137 extends outward from sleeve 135, and a circumferential ring 139 is attached to web 45 with a spherical elastomer layer 140. Layer 140 allows for a small amount of relative angular motion between web 137 and ring 139, which occurs as the angle between arm 111 and the outer portion of blade 107 changes during flapping of arm 111.

Bearing 131 is preferably a laminated elastomeric bearing, comprising alternating elastomer layers and rigid layers, which allows for both rotation of blade 107 about pitch axis 117 and for out-of-plane flapping about flap axis 141 in the directions shown by arrows 143, 145.

Hub 105 comprises hub plates 147, 149, 151 and yokes 113, which are each mounted between two of plates 147, 149, 151 in a stacked arrangement. Each adjacent pair of plates 147, 149, 151 retains a yoke 113 therebetween and forms opposing augmented flexure regions for arms 111 for each yoke 113. FIGS. 6 and 7 show oblique and cross-sectional side views of one portion of assembly 103, and the flexure region for one of arms 111 is visible. In addition, each bearing 131 is retained within a void, or pocket 153, formed by each pair of plates 147, 149, 151.

Upper hub plate 147 has a curved surface 155 at a peripheral edge, and upper surface 157 of yoke 113 bears against curved surface 155 as arm 111 moves in the direction of arrow 143. Curved surface 155 provides for reduction of bending stress concentrations occurring in yoke 113 during flapping. Likewise, middle plate 149 has a curved surface 159 at a peripheral edge, and lower surface 161 of yoke 113 bears against curved surface 159 as arm 111 moves in the direction of arrow 145.

An inboard beam 163 is used to connect blade 107 to the associated bearing 131, and beam 163 is able to rotate relative to hub 105 with blade 107 about pitch axis 117 and flap axis 141. Beam 163 has a body 165 and a shaft 167 that extends in an inboard direction from a central part of body 165. Each beam 163 is located within an aperture 169 formed in the associated arm 111, and aperture 169 is large enough to allow for the amount of rotation of beam 163 required for movement of blade 107 during operation. Shaft 167 is affixed within a central portion of bearing 131, and the elastomeric layers of bearing 131 deform during rotation of beam 163 relative to hub about pitch axis 117 and flap axis 141. While allowing for rotation of beam 163, bearing reacts in-plane lead/lag forces, so that the configuration is stiff in plane. Beam 163 has mounting surfaces 171, which are configured to be attached to inner surfaces 173 of blade 107.

Referring specifically to FIG. 7, bearing 129 comprises a circumferential outer race 175 and a bearing element 177, and bearing element 177 may be of any appropriate type, such as sets of roller pins, sets of ball bearings, or polymer bearings. Outer race 175 is attached to an inner surface 179 of the corresponding blade 107, allowing blade 107 and outer race 175 to rotate together about pitch axis 117 relative to the associated arm 111.

Referring again to FIGS. 5 through 7, as arm 111 encounters in-plane forces from blade 107, these forces tend to cause buckling, or separation, of the layers comprising arms 111. To limit or prevent this separation through clamping force, optional arm clamps 181 are placed on arms 111 between bearing 129 and aperture 169. Each clamp 181 comprises an upper plate 183, a lower plate 185, and fasteners 187 for affixing plates 183, 185 to each other around arm 111. A groove 189 is formed in each plate 183, 185 (visible at the outboard ends of each plate 183, 185) that cooperate when installed to form an aperture for receiving the cross-section of arm 111. Additionally, optional inboard clamps 191 may also be used to limit separation of layers of arm 111 on either side of aperture 169 through clamping force. Each clamp 191 comprises an upper plate 193, a lower plate 195, and fasteners 197 for affixing plates 193, 195 to each other. The embodiment shown has one clamp 181 on arm 111, though more than one clamp 181 may be used on each arm 111. Also, the embodiment shown has two clamps 191 on each side of aperture 169, though more or fewer clamps 169 may used.

The decision to use or not use one or more of clamps 181, 191, as well as the installed locations of clamps 181, 191, will be driven by the dynamic characteristics desired in the rotor system. It should be noted that bearings 131 and 129 do not react centrifugal forces from blade 107. All of the centrifugal forces are transmitted into yoke 113 through the associated blade mount 115 at the outboard end of arm 111.

The rotor configurations described above provide for several advantages, including: (1) compact central hub assembly; 2) reduced flapping moments due to moving the flapping hinges further inboard than in previous designs; and 3) reduced weight and cost.

While this invention has been described with reference to at least one illustrative embodiment, this description is not intended to be construed in a limiting sense. Various modifications and combinations of the illustrative embodiments, as well as other embodiments of the invention, will be apparent to persons skilled in the art upon reference to the description.

The invention claimed is:

1. A rotor assembly for a rotary-wing aircraft, the rotor comprising:
    a central hub assembly having a flexure-type, twist-shank yoke with multiple arms, each arm being adapted for a rotor blade to be mounted thereto, the arms providing for pitch changes of blades attached to the yoke through twisting of portions of the arms about a corresponding pitch axis;
    an arm aperture formed in an inboard portion of each arm;
    an inboard pitch bearing associated with each arm, the inboard pitch bearing being attached to the hub assembly and allowing for rotation of the attached blade about the pitch axis, the inboard pitch bearing also allowing for out-of-plane motion of the arm relative to the hub assembly about a flapping axis;
    an inboard beam connected to each inboard pitch bearing and adapted to be attached to an associated blade, the beam extending through the associated arm aperture; and
    an outboard pitch bearing associated with each arm, the outboard pitch bearing being attached to the associated arm a selected distance from the inboard pitch bearing and allowing for rotation of the attached blade about the pitch axis.

2. The rotor assembly according to claim 1, further comprising:
    at least one arm clamp surrounding a portion of an arm, so as to limit separation of layers of the arm.

3. The rotor assembly according to claim 1, wherein the yoke is formed from multiple layers of composite material separated by layers of elastomeric material.

* * * * *